Nov. 4, 1969   D. A. GLASER   3,476,291
METHOD AND APPARATUS FOR DISPENSING MEASURED
QUANTITIES OF LIQUIDS
Filed June 13, 1968   3 Sheets-Sheet 1

INVENTOR.
Donald A. Glaser
BY Flehr, Hohbach, Test,
Albritton & Herbert
Attorneys INVENTOR.
Donald A. Glaser

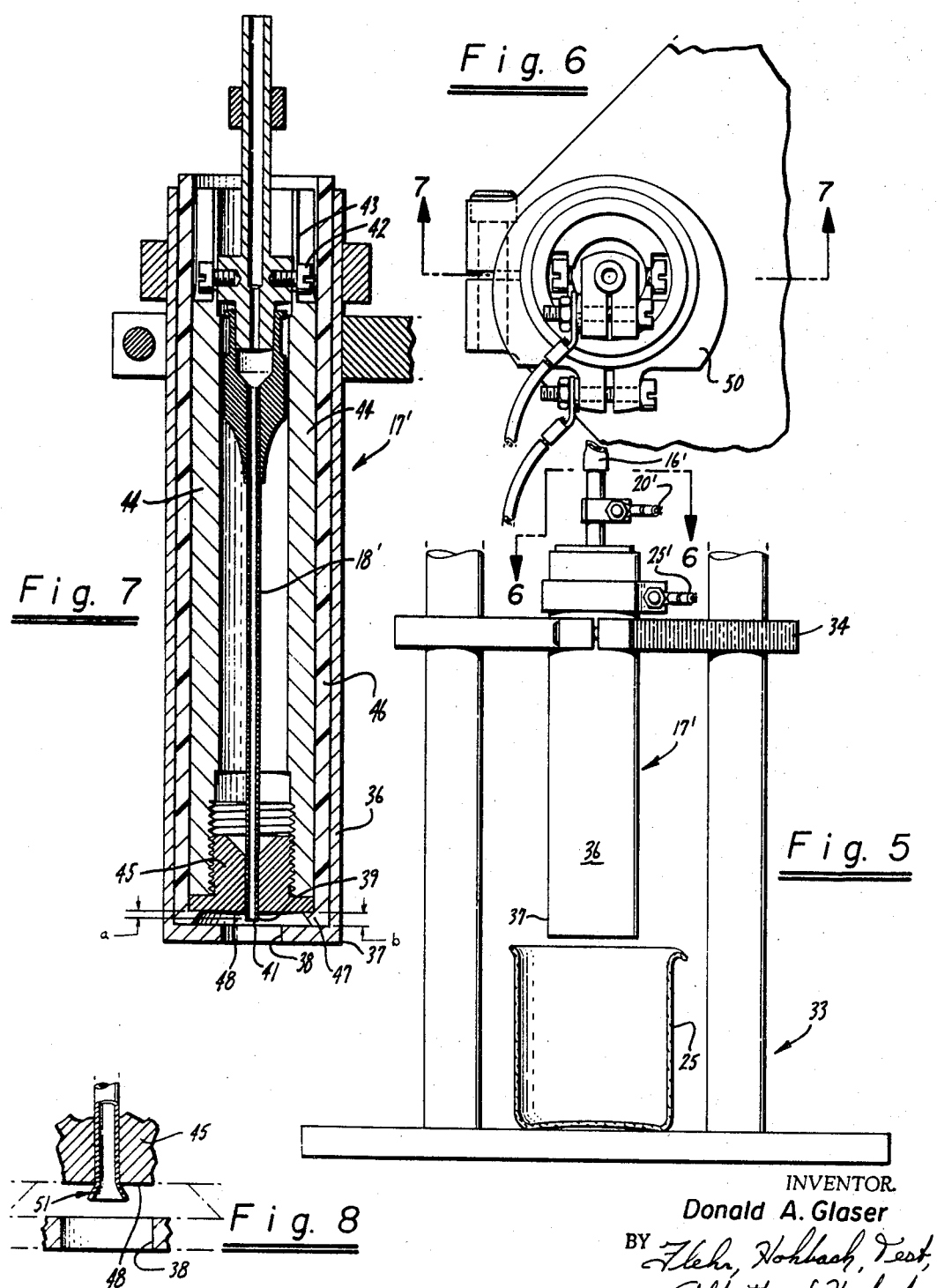

United States Patent Office 3,476,291
Patented Nov. 4, 1969

---

3,476,291
METHOD AND APPARATUS FOR DISPENSING MEASURED QUANTITIES OF LIQUIDS
Donald A. Glaser, Berkeley, Calif., assignor to Berkeley Scientific Laboratories, Inc., Berkeley, Calif., a corporation of Texas
Continuation-in-part of application Ser. No. 549,301, May 11, 1966. This application June 13, 1968, Ser. No. 736,780
Int. Cl. B67d 5/08; E01f 11/00
U.S. Cl. 222—76    14 Claims

ABSTRACT OF THE DISCLOSURE

A liquid dispensing nozzle and method in which a strong electric field pulse is applied to a liquid at an orifice in a conduit causing charge redistribution resulting in removal of a drop from the conduit. Apparatus including a source of voltage pulses and an arrangement of conductive members for securing the electric field are disclosed.

---

Relating applications

This is a continuation-in-part of my copending patent application Ser. No. 549,301, filed May 11, 1966, now abandoned.

Background of the invention

This invention relates to a method and apparatus for dispensing measured quantities of liquids and particularly small liquid samples or reagents as used in chemical and biological testing. The invention is especially useful in testing systems such as in enzyme assays and in pH or other end point determinations.

Heretofore, the measurement and delivery of small quantities of liquid samples or reagents has been commonly carried out by means of syringes or pipettes which are normally manually operated, but have been, to some degree, automated. In general, close fitting cylinder-piston arrangements (in syringes) or valves which are used to operate such syringes are susceptible of considerable wear and consequent required replacement. Adjustment of the quantity of fluid to be delivered requires a selection of a particular mechanical stop, in the case of a syringe, or requires manual or other sensing of the height of a fluid column in the case of a pipette. Either of these procedures requires considerable apparatus, if automated, and if a number of different quantities are to be selected. Furthermore, the accurate operation of syringes and pipettes requires two precise steps: first, a precision volume upon filling, and then a precision emptying to the desired degree. This requirement of two precise steps not only introduces opportunity for error but also is a time consuming step. There is, therefore, a need for a new and improved system for dispensing fluids.

Summary of the invention and objects

It is a general object of the invention to provide a method and apparatus for dispensing fluids which will overcome the above named disadvantages.

Another object of the invention is to provide a method and apparatus of the above character in which no precise filling step is required, and in which the fluid being dispensed is metered without the direct use of human perception and judgment.

Another object of the invention is to provide a method and apparatus of the above character in which the liquid to be dispensed is controlled by electrical means without the use of any mechanical moving parts, thereby eliminating error due to wearing or nonfit of parts.

Another object of the invention is to provide a method and apparatus of the above character which utilizes, as its essential operating force, an electric field which is directly coupled to the liquid to be dispensed to meter and dispense the same.

Another object of the invention is to provide apparatus of the above character which utilizes high voltage pulses and which is well shielded to protect the operator.

The invention is predicated upon the discovery that the application of an electric field at the tip of a dispensing needle can be used to induce discharge of fluid from the dispensing needle in a highly reproducible amount, which amount depends on the intensity of the applied electric field and to the duration of its application. Thus, measured quantities of liquid can be dispensed and controlled by repeated application of electrical pulses and without the use of any moving parts, valves, sensing mechanisms, and the like.

In general, the method and apparatus of the invention operates by supplying the liquid to be dispensed to a conductive nozzle under a predetermined constant low pressure. A high voltage pulse of predetermined duration and strength is applied between the nozzle and a conductive ground plane formed adjacent thereto to thereby cause a discharge of a quantity of the liquid from the nozzle. The quantity of liquid discharged is found to be a single valued function (i.e., completely determined) of the duration and amplitude of the pulse. Additionally, the quantity is nearly proportional to the duration of the pulse which can therefore be adjusted to control the quantity of liquid dispensed. In a preferred form, the applied pulses take the form of a series of pulses having constant value and a variable duration.

The above described mode of operation is to be distinguished from the use of free electron current or brush discharge as proposed for vaporizing volatile constituents of a filament as in U.S. Patent No. 705,691 to Morton. The present invention teaches the initiation and cessation of discharge of a precise but small quantity of liquid from a nozzle without any form of electrical breakdown such as sparks, brush discharge or the like.

In accordance with the method and apparatus of the present invention, the electric field pulse is insufficient to cause electrical breakdown but is sufficient to cause a surface charge redistribution at the surface of liquid formed at the nozzle orifice which add to the available hydrostatic pressure to overcome the cohesive forces within the liquid (usually collected under the designation, surface tension) and thereby cause formation and withdrawal of a liquid drop. The quantity contained in this drop is highly reproducible and directly dependent upon the strength and duration of the applied electric field. The charge redistribution which causes the accumulation at the liquid surface can result from ionic migration, or reorientation of charge asymmetric molecules, or other mechanisms including induced asymmetry due to electric field induced distortions in the electron orbitals. As used herein, the terms polarization or charge induction are intended to comprehend such charge redistribution by whatever mechanism it may achieve.

Further objects and features of the invention will appear from the following description in which the preferred embodiment of the invention has been set forth in detail in conjunction with the accompanying drawings.

BRIEF DESCRIPTION OF THE DRAWINGS

FIGURE 5 is an elevational view of another form of preferred apparatus for practicing the invention.

FIGURE 6 is a view taken along the lines 6—6 of FIGURE 5.

FIGURE 7 is a cross-sectional view taken along the lines 7—7 of FIGURE 5.

FIGURE 8 is a cross-sectional view similar to that of FIGURE 1 showing a modified form of a dispensing nozzle constructed according to the invention.

DETAILED DESCRIPTION OF THE PREFERRED EMBODIMENT

Figure 1:
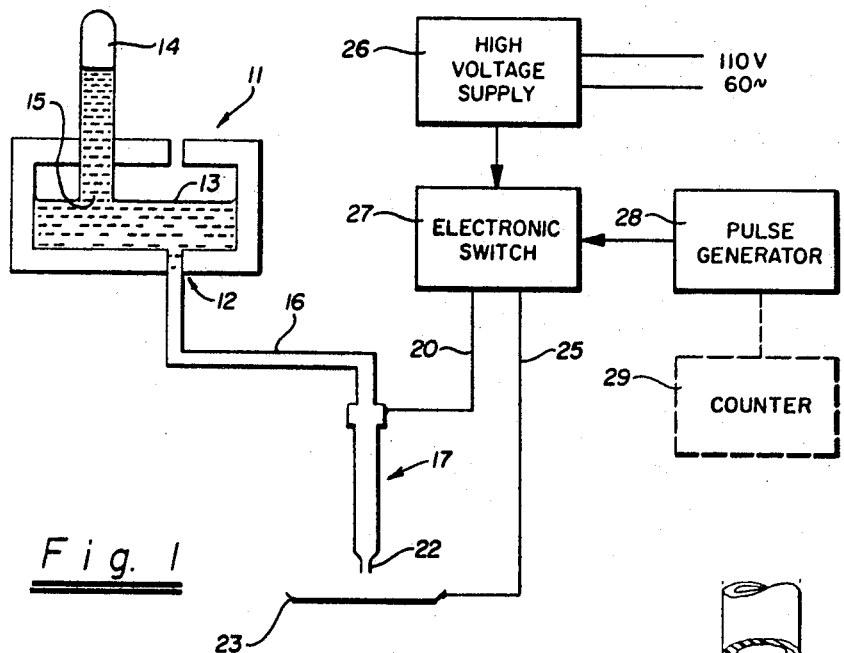
FIGURE 1 is a schematic view of apparatus incorporating the invention.
Figure 2:
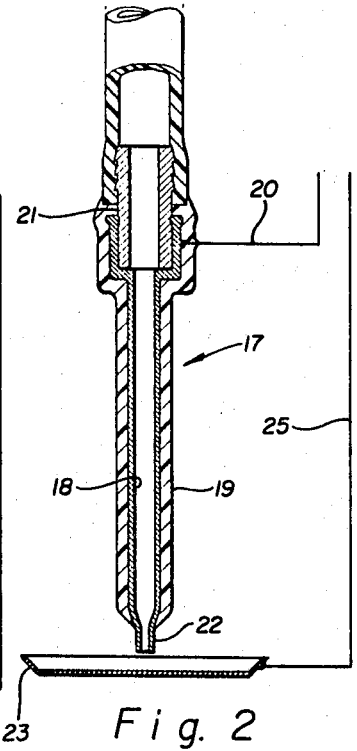
FIGURE 2 is a longitudinal cross-sectional view of the dispensing nozzle of the apparatus of FIGURE 1.

Referring now to FIGURES 1 and 2, there is shown a reservoir 11 containing the liquid to be dispensed. Means are provided to maintain a constant hydrostatic pressure at the outlet 12. For this purpose the height of the liquid 13 is maintained by an inverted container such as a bottle 14 partially full of liquid. Liquid is fed from the bottle 14 into the reservoir when the liquid level drops below the level of the mouth 15 of the bottle 14. The outlet 12 of the reservoir is connected to a dispensing nozzle 17 via a tube 16. The tube 16 is preferably constructed of an insulating material, such as rubber or plastic which is inert to the reagent being handled. The dispensing nozzle comprises a hollow, conductive needle 18 encased in an outer sleeve 19 of insulating material for the protection of operating personnel against the high voltages which are present. The needle-like structure 18 terminates at its upper end in a fitting 21 which connects the same to the tube 16. A conductive lead 20 is connected to the needle 18 for connecting the needle to a source of high voltage pulses as hereinafter described.

The lower end of the needle 18 defines an orifice 22 which is sufficiently small so that the forces of the liquid surface at the orifice prevent liquid from passing out of the nozzle under the hydrostatic head developed by the liquid 13 in the reservoir 11.

Means is provided for defining a conductive ground or reference voltage plane positioned in close, spaced relation below the dispensing nozzle. Such means preferably comprises a liquid receiving disk or vessel 23 which is constructed with portions made of conductive material and connected through conductive lead 25 to a reference potential such as ground.

Means is provided for applying a high voltage electric pulse between the nozzle 17 and the means defining the reference plane. Such means comprises a high voltage supply 26 which can supply a high D.C. voltage from available low voltage mains. The high voltage from the supply 26 is connected to the nozzle 17 through an electronic switch 27 which is controlled by a pulse generator 28. The pulse generator 28 and the electronic switch 27 cooperate to select the duration and amplitude of the high voltage pulse applied and consequently the strength of the electric field developed between the nozzle and the reference plane. A counter 29 is preferably connected to the pulse generator output to count the total number of pulses delivered by the generator to the switch.

When the switch 27 connects the high voltage supply to the nozzle 17, a high intensity electric field is established between the tip of the nozzle and the means forming the ground plane. The application of this electric field causes charge redistribution in the liquid at the lower end of the nozzle by electrical induction such that the liquid at the end of the nozzle is acted upon by the electric field to increase the pressure to break the surface and to draw the liquid from the nozzle. Such charge redistribution causes a surface charge to develop at the liquid surface, as by polarization or charge migration, which surface charge is acted upon by the field created by the pulse to cause a force of electrostatic attraction which adds to the hydrostatic pressure to overcome the cohesive forces of surface tension and to thereby cause the initiation of the formation of a drop. When the pulse is cut off, the field is extinguished causing cessation of flow from the nozzle. During periods when there is no electric field between the nozzle and the means defining the ground plane, the nozzle is kept filled by a combination of hydrostatic pressure and capillary action, but no liquid is dispensed from the nozzle because the previously mentioned forces are balanced by the surface tension acting on the liquid surface at the orifice 22.

It is important that the voltage applied be less than that which would cause electrical breakdown of the atmosphere or with the liquid itself, for such breakdown would probably have deleterious effects upon the composition of the liquid, and would render uncertain the amount being dispensed.

Figure 3:
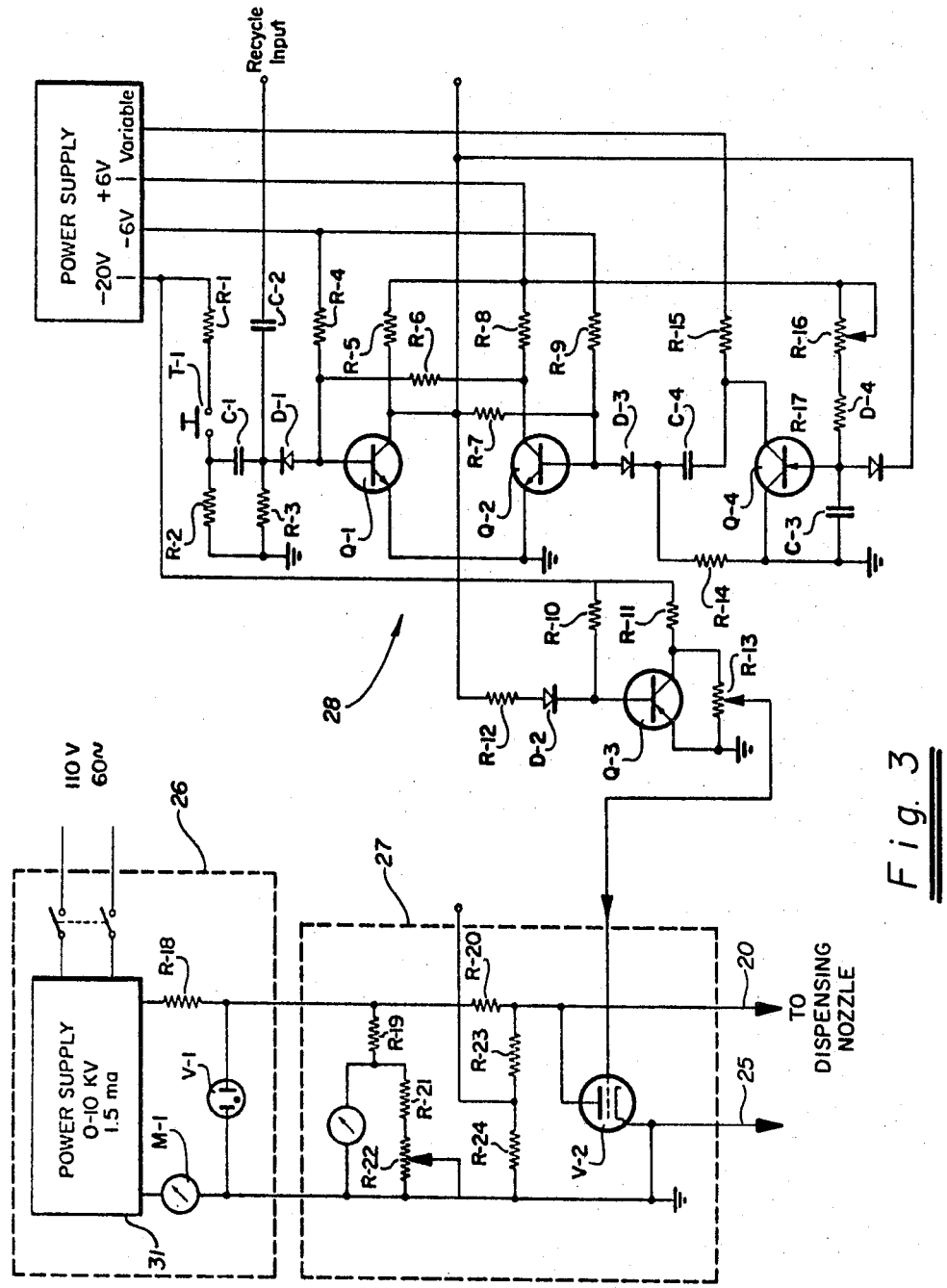
FIGURE 3 is a schematic diagram of electronic circuits utilized in the apparatus of FIGURE 1.

FIGURE 3 shows suitable electronic circuitry for forming the high voltage supply 26, the switch 27, and the pulse generator 28, now to be described.

HIGH VOLTAGE SUPPLY

A power supply 31 having an output of 0 to 10 kilovolts at 1.5 milliamperes was utilized as the primary power source. One such suitable power supply is that available from Plastic Capacitors, Inc., model HV–100–502M. Additional regulation of the power supply is provided by resistor R18 and the gas discharge tube V1. Ammeter M1 measures the current drawn from the supply 31.

ELECTRONIC SWITCH 27

The resistors R19, R21 and R22, together with meter M2, provide a 0–10,000 volt monitoring voltmeter. R23 and R24 constitute an attenuator for monitoring the output voltage on an oscilloscope, if desired. The electronic switching action is provided by tube V2 and associated resistor R20. Normally, the grid of the tube V2 is at a ground potential and the output to the nozzle is a low potential corresponding to the saturation voltage of the tube. A negative pulse from the pulse generator 28 serves to reduce the current through the tube V2 which correspondingly reduces the voltage drop across R20, and causes a consequent rise in the output voltage as seen on conductor 20. The amplitude of the output pulse is proportional to the amplitude of the pulse from the pulse generator and to the applied voltage, about −15 volts from the generator producing a 5,000 volt output on conductive lead 20.

THE PULSE GENERATOR 28

The pulse generator consists of a flip-flop circuit associated with transistors Q1 and Q2. A timing circuit to control the duration of the pulse is provided by unijunction Q4 and associated RC network comprising R16, R17 and C3. The output signal from the flip-flop is inverted by amplifier and associated transistor Q3. Pushing the manual trigger T1 causes the flip-flop to go into a quasi-stable state (Q1 off and Q2 on), and causes the start of the timing function of the unijunction timing circuit. At the end of the predetermined time interval, which is variable from 0 to 2 seconds, the unijunction will reset the flip-flop to its stable state (Q1 on and Q2 off). Pulse width duration is controlled by varying R16.

The inverter associated with Q3 provides the correct voltage output variable from 0 to −20 volts for controlling the switch 27.

A dispensing apparatus was constructed in which the values for the several components shown in the diagram were as follows:

High voltage supply

S1 _____ Power supply.
M1 _____ Ammeter 0–1 milliampere.
R18 _____ 10M ohms.
V1 _____ GV6C 6000 gas filled regulator tube.

Electronic switch 27

| | |
|---|---|
| R19 | 100M ohms. |
| R20 | 20M ohms. |
| R23 | 100M ohms. |
| R24 | 100K ohms. |
| R21 | 1.8K ohms. |
| R22 | 1K potentiometer. |
| M2 | 0–10 kv. voltmeter. |
| V2 | 7325 triode. |

The pulse generator 28

| | |
|---|---|
| R1 | 10K ohms. |
| R2 | 1M ohms. |
| R3 | 6.8K ohms. |
| R4 | 82K ohms. |
| R5 | 1K ohms. |
| R6 | 15K ohms. |
| R7 | 15K ohms. |
| R8 | 1K ohms. |
| R9 | 82K ohms. |
| R10 | 20K ohms. |
| R11 | 1K ohms. |
| R12 | 2K ohms. |
| R13 | 20K potentiometer. |
| R14 | 6.8K ohms. |
| R15 | 270 ohms. |
| R16 | 200K or 500K potentiometer. |

R17, 1K ohms

| | |
|---|---|
| Q1 | 2N3646 transistor. |
| Q2 | 2N3646 transistor. |
| Q3 | 2N3638 transistor. |
| Q4 | 2N2646 transistor. |
| D1 | 1N4009 diode. |
| D2 | 1N4009 diode. |
| C1 | 0.01 µf. |
| C2 | 300 pf. |
| C3 | 6 µf. or 2 µf. |
| C4 | .001 µf. |
| D3 | 1N4009 diode. |
| D4 | 7N4009 diode. |

The operating parameters for the apparatus were as follows:

| | | |
|---|---|---|
| Hydrostatic pressure head ($H_2O$) | inches | 1⅝ |
| Needle: | | |
|    Length | do | 2 |
|    Gauge | | 23 |
|    Internal diameter | inch | .013 |
| Pulse amplitude | volts | 5,000 |
| Pulse length, variable | seconds | 0–2 |
| Nozzle to ground plane spacing | inch | ¼ |

Figure 4:
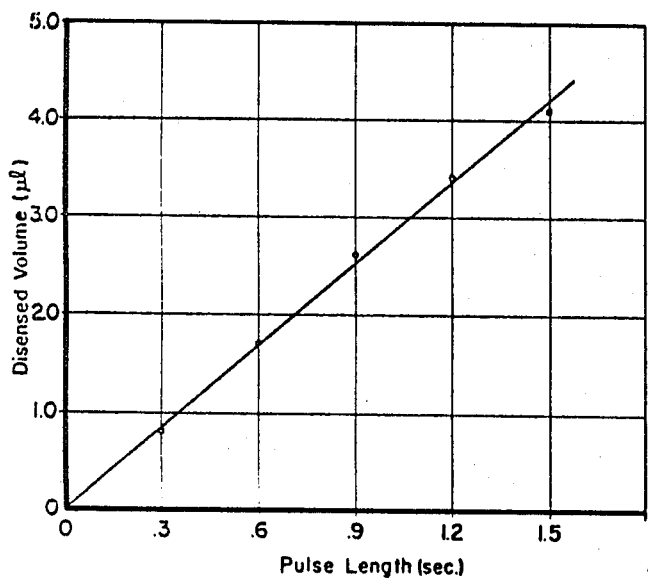
FIGURE 4 is a graph depicting the calibration curve of a particular apparatus constructed according to the invention.

The results of testing the above apparatus are shown in the calibration curve depicted in FIGURE 4 which relates pulse length or duration to the dispensed volume. The direct proportionality between dispensed volume and the pulse length is seen from the linearity of the curve. It will also be noted that very small quantities of liquid can be accurately dispensed.

Referring to FIGURES 5 through 8, there is shown another form of dispensing apparatus constructed according to the invention which does not require the use of a special conductive receiving disk. Like parts have been given the same numbers with a prime mark. Generally, the apparatus consists of a mounting stand 33 including a horizontal support clamp 34 which mounts a dispensing nozzle 17' having an outer cylindrical member 36 closed at its lower end 37 with a conductive disk which is provided with an aperture 38 for permitting fluids to be discharged from within the member. Preferably, the entire member 36 is made of conductive material. A fluid conduit 18' is mounted within the member and is provided with conductive tip 39 forming a discharge orifice 41 at its lower end. The other end is connected through tube 16' to a source of fluid to be dispensed in a manner suitable to that shown in connection with FIGURES 1 and 2.

The fluid conduit is supported at its upper end on screws 42 passed through slots 43 in the wall of a cylinder member 44 laterally supported by a sleeve 46 of insulating material, and vertically supported at a lower limit in spaced relation to the end of the outer member by a rim 47 formed on the lower end of the sleeve. As shown, the end 39 of the conduit 18' extends beyond the end of the inner member and is aligned with the aperture 38 in the outer member. The end of inner member 44 is substantially closed and its surface is made of conductive material as by making it of a metallic plug 48. The conductive end 39 of conduit 18' and the conductive end surface 48 of inner member 44 are electrically interconnected so that a voltage pulse applied, for example, between the end of the outer member and the conduit raises the potential of both the conduit end 39 and the surface 48 with respect to the end of the outer member. In the embodiment shown, the entire conduit 18' and the end plug 48 are electrically conductive, and are connected through cable source 20' of high voltage pulses as previously described in connection with FIGURES 1 through 3, while the outer member is connected through clamp 50 and cable 25' to ground or other suitable reference potential.

Whenever a voltage pulse is applied, a momentary pulse of an electric field will appear between the end 39 of the conduit wth the connected surface 48, and the grounded end wall 37. The particular shape of the electric field is controlled by the amount of projection $a$, if the conduit (controlled by the positioning of screws 42 along slot 43) and the distance $b$, between surface 48 and inside of the end 37 of member 36 (controlled by adding dielectric spacers, not shown, or by clamp 50). The extension of the tip of the conduit the distance $a$, helps compensate for the non-uniformity of field caused by the aperture 38, and for many liquids tested, an $a$ value of about 2–3 mm. has been found satisfactory. The remaining operation of the nozzle is in other respects the same as that previously described.

In certain dispensing operations, the liquid tends to creep around the edge at tip 39 and in this way contributes an uncertainty to the exact amount of each drop actually dispensed. This problem is eliminated by providing the end of the conduit 18' with a coating of Teflon or other nonstick substance which is not wet by the liquid. Another solution is to change the angle of attack of the liquid by flaring the tip of the conduit outwardly a slight amount as shown at 51 in FIGURE 8. This nozzle shown in FIGURES 5 through 8 has been found very satisfactory and provides for complete personal shielding of the high voltage parts by the grounded member 36. And, the lower end of the outer member serves as the reference potential, eliminating the need for special shallow, conductive receiving disks.

Thus, there has been shown a very effective method and apparatus for precisely dispensing liquids. The system utilizes no moving parts and requires no precise filling or emptying of any apparatus. The entire operation is carried out easily by the direct application of easily controlled electric pulses to portions of the apparatus. Such method and apparatus is extremely useful in automatically carrying out a sequence of liquid dispensing operations as is usual in enzyme assays and many other chemical procedures.

Many other uses and adaptations of the invention shown and described herein will occur to those skilled in the art without departing from the spirit and the scope of the invention. Accordingly, it should be understood that the disclosures and descriptions herein are purely illustrative and are not intended to be limiting, except as by the following claims.

I claim:
1. Apparatus for dispensing a measured quantity of a liquid, a nozzle having a liquid dispensing orifice, means for supplying the liquid to be dispensed to the nozzle under a predetermined substantially uniform pressure, said orifice having an area such that the surface of the liquid at the orifice has sufficient surface tension to prevent the liquid from passing out of the orifice, and means for applying an electric field pulse of predetermined strength and duration to the liquid in said nozzle to cause breaking of the surface and to cause a predetermined quantity of liquid to be discharged from the orifice in direct proportion to the strength and duration of the electric field, said electric field being the primary means causing discharge of the predetermined quantity of liquid from said orifice, said means for supplying a liquid includes a reservoir and means for maintaining the liquid level in said reservoir and means insulating said reservoir from said nozzle.

2. Apparatus as in claim 1 in which said means for applying an electric field includes a vessel formed of conductive material into which the liquid is to be dispensed.

3. Apparatus for dispensing a measured quantity of a liquid, a conductive nozzle having a liquid dispensing orifice, means for supplying the liquid to be dispensed to the nozzle under a predetermined pressure including a reservoir, means for maintaining the liquid level in said reservoir, and a means for electrically insulating said reservoir from said nozzle, said orifice having an area such that the surface of the liquid at the orifice has a sufficient surface tension to prevent the liquid from passing out of the orifice, conductive means positioned in closely spaced relation to said nozzle, and means for applying a high voltage pulse between said nozzle and said conductive means which is insufficient to cause electrical breakdown including sparks to occur between said nozzle and said conductive means to thereby create an electric field in the liquid in said nozzle to cause the liquid to become polarized in a direction to increase the pressure of the liquid in the nozzle to cause breaking of the surface and discharge of a predetermined quantity of liquid from the orifice in direct proportion to the strength and duration of the high voltage pulse.

4. Apparatus as in claim 3 in which said means for supplying the high voltage pulse includes means for accurately selecting the duration and amplitude of the pulse.

5. Apparatus as in claim 3 in which said nozzle is a hollow needle of small inside diameter said needle being covered along its lentgh by insulating material.

6. Apparatus as in claim 3 in which said means for applying high voltage pulse includes a source of high voltage, switch means connecting said source of high voltage to said nozzle, and a pulse generator for generating control pulses connected to said switch means to operate the same.

7. Apparatus for dispensing a measured quantity of a liquid, a conductive nozzle having a liquid dispensing orifice, means for supplying the liquid to be dispensed to the nozzle under a predetermined pressure, said orifice having an area such that the surface of the liquid at the orifice has a sufficient surface tension to prevent the liquid from passing out of the orifice, conductive means positioned in closely spaced relation to said nozzle, and means for applying a high voltage pulse between said nozzle and said conductive means to create an electric field in the liquid in said nozzle to cause the liquid to become polarized in a direction to increase the pressure of the liquid in the nozzle to cause breaking of the surface and discharge of a predetermined quantity of liquid from the orifice in direct proportion to the strength and duration of the high voltage pulse, said means for applying high voltage pulse includes a source of high voltage, switch means connecting said source of high voltage to said nozzle, and a pulse generator for generating control pulses connected to said switch means to operate the same, switch means includes an electronic device capable of being turned on and off by said control pulses.

8. In a method for dispensing a measured quantity of a liquid from apparatus for dispensing the same including a nozzle having a liquid dispensing orifice, means for supplying the liquid to be dispensed to the nozzle, said orifice having an area such that the surface of the liquid at the orifice has sufficient surface tension to prevent the liquid from passing out of the orifice, means for applying an electric field pulse to the liquid in said nozzle, said means for supplying a liquid including a reservoir and means for maintaining the liquid level in said reservoir and means insulating said reservoir from said nozzle, the steps of maintaining the liquid supplied to said nozzle at a predetermined pressure which is insufficient to cause the surface formed by the liquid at the orifice to break and liquid to flow therefrom, applying said electric field pulse at a predetermined duration and amplitude to the liquid at the end of said nozzle to cause charge redistribution in the liquid and accumulation of charge at said liquid surface in a direction which increases the pressure of the liquid in the nozzle but maintaining said electric field pulse at a strength which is insufficient to cause electrical breakdown including sparks to occur at said nozzle, said applied electric field pulse thereby causing the surface of said liquid to be broken and the discharge of a quantity of said liquid through the orifice in said nozzle, said electric field pulse being the primary means causing the discharge of said quantity of liquid, said quantity being related in direct proportion to the duration and strength of the electric field, repeating the step of applying the electric field a predetermined number of times to dispose a given volume of liquid, and counting the number of repeated applications of electric field to determine the total amount of liquid dispensed.

9. A method as in claim 8 further including the step of adjusting the strength and duration of the electric field pulse to control the quantity of liquid dispensed.

10. A dispensing nozzle comprising a conductive outer member, a conductive inner member and nonconductive spacer interposed between said members, said outer member being closed at its lower end with a conductive disk having an aperture therein for permitting liquid to be dispensed for the nozzle and freely through said aperture, a hollow conduit of conductive material, means supporting said conduit within said outer member, said means forming a disk at the lower end of said conduit and spaced from said first named disk, said disk having a hole therein for permitting the end of said conduit to protrude into the region between said disks, means for grounding said outer member and first named disk, means for applying high voltage pulses to said conduit and second named disk.

11. A nozzle as in claim 10 further including means for adjusting the distance said conduit protrudes through said hole in the second named disk.

12. A nozzle as in claim 10 further including means provided at the tip of said conduit to minimize liquid creep around the edge at said tip.

13. A nozzle as in claim 12 in which the tip of said conduit is flared outwardly.

14. A nozzle as in claim 12 in which the outer surface at the tip of said conduit is given a coating of nonstick material.

References Cited

UNITED STATES PATENTS

| 705,691 | 5/1902 | Morton | 317—3 X |
|---|---|---|---|
| 1,958,406 | 5/1934 | Darrah | 317—3 |
| 1,969,379 | 8/1934 | Meissner | 317—3 X |
| 2,859,129 | 11/1958 | Hayford | 317—3 X |
| 3,087,332 | 4/1963 | Kern | 239—102 X |
| 3,373,437 | 3/1968 | Sweet et al. | 317—3 X |

FOREIGN PATENTS 147,337   10/1962   U.S.S.R.

SAMUEL F. COLEMAN, Primary Examiner

U.S. Cl. X.R.

222—64, 282, 420